Sept. 29, 1936.   R. C. NEWHOUSE   2,055,941
COOLER
Original Filed Aug. 22, 1932
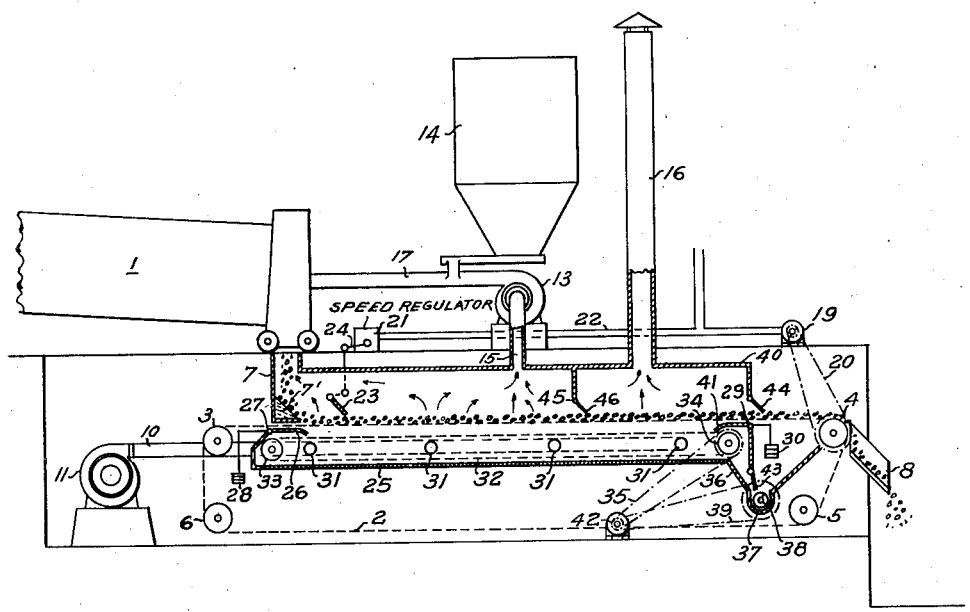

Patented Sept. 29, 1936

2,055,941

UNITED STATES PATENT OFFICE 2,055,941

COOLER

Ray C. Newhouse, Wauwatosa, Wis., assignor to Allis-Chalmers Manufacturing Company, Milwaukee, Wis., a corporation of Delaware Original application August 22, 1932, Serial No. 629,769. Divided and this application April 2, 1936, Serial No. 72,243

7 Claims. (Cl. 263—32)

The invention relates to coolers and similar apparatus, and it is concerned more specifically with a cooler for Portland cement clinker.

In an earlier application Serial No. 629,769, filed August 22, 1932 for a Clinker cooler of which this application is a division, a clinker cooler of the "air quenching" type has been disclosed, that is, a type of cooler in which the clinker is spread out and advanced in the form of a moving bed, and in which a large volume of cooling air is forced through the moving bed, the air cooling the clinker so rapidly as to chill or quench it. In order to cool the entire mass of clinker which passes through the cooler, in a satisfactory manner and to produce the desired air quenching effect not only upon part but upon all of the clinker, it is necessary that the entire bed of clinker be penetrated by a large and uniform current of cooling air, and this leads to the requirement that the bed be of substantially uniform thickness throughout. If the bed were unequally thick or if there were bare spots in it the cooling air would rush through the thinner portions or through the bare spots, and an inadequate supply of cooling air would result through the thicker portions of the bed; in other words the air supply would be excessive where it is needed least and inadequate where it is needed most.

The clinker is discharged into the air quenching cooler directly from the kiln and has a very high temperature, usually between the limits of 2000° F. and 2400° F. The cooling air which has passed through the bed of clinker is therefore more or less heated, the air passed through a first portion of the bed at the end where the hot clinker is received being the hottest, the air passed through an intermediate portion of the bed being of lower temperature, and the air passed through the last portion of the bed at the end where the clinker is discharged from the cooler, being the coolest. The hottest air is preferably used as secondary combustion air in the kiln, the next hottest air as primary combustion air, and the coolest air is either wasted or used for purposes other than combustion in the kiln. The term "primary combustion air" is here understood to mean all air used to transfer and introduce fuel into the kiln from a fuel container, such as a coal bin, and the term "secondary combustion air" is here understood to mean all air used for combustion in the kiln, exclusive of the primary air. In view of the mentioned uses which are to be made of the cooling air after it has penetrated the bed of clinker, it is also important that the bed be of substantially uniform thickness throughout its length and width, and, moreover, the thickness of the bed in its entirety should be kept fairly close to a predetermined amount, because the temperatures of the primary and secondary combustion air should be about constant, and if a portion of the bed were at times substantially thicker than the rest of the bed, or if there were bare spots in it, or if the thickness of the bed in its entirety would vary considerably, the temperatures of the primary and secondary combustion air would also vary.

The successful operation of a clinker cooler of the air quenching type as referred to hereinbefore depends, as will be seen, to a considerable extent upon proper formation of the clinker into a bed of substantially uniform thickness and upon a fairly close maintenance of the bed at a predetermined thickness, and in this connection a disturbing factor is encountered by the well known fact that a rotary cement burning kiln discharges the burned material in irregular quantities, that is, at times more material is discharged than at others.

It is an object of the invention to provide a clinker cooler of the air quenching type in which the mass of burned material which is discharged from a kiln in irregular quantities, is formed into a moving bed of substantially uniform thickness throughout its width and length, and in which the thickness of the bed in its entirety is automatically kept close to a predetermined amount.

Another object of the invention is to provide improved means for forming a mass of loose material which is delivered in irregular quantities, into a moving bed of substantially uniform thickness throughout its width and length, so that it may be uniformly penetrated by a large volume of treating fluid.

These and other objects and advantages of the invention will be apparent from the following description. A clear conception of an embodiment of the invention and of the operation of a device constructed in accordance therewith may be had by referring to the drawing accompanying and forming a part of this specification.

The drawing shows a schematic view of a clinker cooler of the air quenching type. The reference numeral 1 indicates the discharge end of a rotary cement burning kiln which is arranged above the receiving end of an endless conveyor comprising an endless conveying member 2 trained over top rollers 3 and 4 and over bottom rollers 5 and 6. Associated with the endless member 2, but not shown in the drawing, are suitable load receiving elements arranged to form a perforate support for the mass of burned material which is discharged from the kiln. For instance, the conveyor may be of the bucket type, each bucket having a perforated bottom, or the conveyor may be of any suitable type providing gaps between supporting elements, through which gaps a gaseous cooling fluid may be passed. 19 indicates an electric motor having driving connection with the roller 4 through a belt or chain 20 for driving the endless member 2 of the conveyor. In operation the endless member 2 is driven by the electric motor 19 so that its upper stretch between the rollers 3 and 4 advances in the direction from the roller 3 towards the roller 4, and burned material is discharged from the kiln through the chute 7 upon the endless member 2, the chute having a suitable bottom portion 7¹ of fire brick or the like for directing the burned material upon the endless member 2. A pivoted gate 23 constructed to act as a spreader is mounted above the upper stretch of the endless member 2 a short distance ahead of the bottom portion of the chute 7, and the gate is suitably arranged so as to ride on the material which is advanced by the endless member 2 from the chute 7 towards the roller 4. The normal rate of speed of the endless member 2 is such that at the average rate of discharge from the kiln a relatively thin bed of material, as shown, forms on the advancing upper stretch of the endless member 2, and the gate 23, due to its action as a spreader, insures that the bed covers the entire width of the endless member. The mass of material conveyed by the endless member 2 is discharged at the roller 4 into a chute 8 leading to a clinker storage space, or to any suitable means, such as a conveyor, for disposing of the cooled material. The gate rises and falls with an increase and decrease in the thickness of the bed, and such movement of the gate is transmitted through suitable link mechanism 24 to an electric current regulator 21 which may be of any conventional construction. The current regulator is placed into the circuit 22 of the electric motor 19, and it is so arranged that when the gate 23 rises, the motor 19 is caused to run faster than normal and when the gate 23 falls the motor 19 is caused to run slower than normal. The increase and decrease of the speed of the motor depends on the amount of rise and fall of the gate, that is, the higher the gate rises the faster is the motor caused to run, and vice versa. The control of the speed of the conveyor by means of the rise and fall of the gate 23 suppresses irregularities in the thickness of the bed and automatically maintains the thickness of the bed in its entirety close to a predetermined amount in spite of irregularities in the rate of discharge of burned material from the kiln. If the rate of discharge increases above average the material advanced by the endless member will lift the gate 23 and the motor 19 will immediately run faster so as to take care of the greater mass of material without a substantial increase in the thickness of the bed, and on the other hand, if the rate of discharge from the kiln decreases below average, the gate 23 riding on the material advanced by the endless member will fall and the motor 19 will immediately run slower so as to take care of the smaller mass of material without a substantial decrease in the thickness of the bed.

Cooling air is forced through the endless member of the conveyor from below, and for this purpose a stationary box-shaped air duct 25 having an open top adjacent to the lower side of the endless member 2 of the conveyor is arranged in the space between the rollers 3 and 4. A fan 11 is connected with the air duct through a pipe 10 having a series of outlet openings 31 in one of the longitudinal side walls of the air duct. At the end of the air duct adjacent to the discharge end 1 of the kiln, a swingably supported sealing plate 26 is held in contact with the lower side of the endless member of the conveyor by a weight 28, the sealing plate being fulcrumed at 27 and preventing the escape of cooling air through the space between the transverse end wall of the air duct 25 and the lower surface of the endless member of the conveyor. A similar sealing plate 41 fulcrumed at 29 and urged against the endless member of the conveyor by a weight 30 is provided at the opposite end of the air duct. In operation, fresh cooling air from the atmosphere is forced into the air duct through the openings 31 and penetrates the upper stretch of the endless conveyor and the bed of material thereon. Within the air duct 25 an auxiliary conveyor, indicated at 32, is provided to carry off the fine material which may fall through the perforations of the endles member 2 of the main conveyor. The endless member of the auxiliary conveyor 32 preferably consists of parallel chain members trained over rollers 33 and 34, and drag members extending transversely between the chain members, the lower stretch of the endless member of the auxiliary conveyor being arranged in such relation to the bottom of the air duct 25 that the drag members may slide on said bottom. The auxiliary conveyor is driven by a motor 42 through a suitable power transmitting mechanism 35 in such direction that the lower stretch of its endless member travels in the same direction as the upper stretch of the endless member 2 of the main conveyor, that is, away from the kiln. It will be seen that the fine material falling through the perforations of the endless member 2 of the main conveyor will also fall through the upper stretch of the auxiliary conveyor and accumulate on the bottom of the air duct 25 where it will be swept by the drag members of the auxiliary conveyor towards the end of the air duct adjacent to the roller 34. The velocity of the cooling air entering the air duct through the openings 31 is preferably kept low enough so that the fine particles falling through the perforations of the endless member 2 of the main conveyor are not picked up by the cooling air and thrown up against said endless member. The auxiliary conveyor delivers the fine material on to a chute 36 and into a cross screw conveyor having a trough 37 and a conveyor screw 38, the cross screw conveyor extending transversely to the main and auxiliary conveyors and being driven by the motor 42 through a suitable power transmitting mechanism indicated at 39. From the cross screw conveyor the fine material is conveyed to clinker storage by means of any convenient conveying apparatus, not shown. The transverse end wall of the air duct 25 adjacent to the roller 34 is extended downwardly and has, at its lower end, hinged thereto a flap 43 permitting the passage of fine material from the chute 35 into the trough 37 but preventing escape of air from the air duct 25.

A stationary air chamber, generally indicated by 40, is arranged over the portion of the endless member 2 which extends over the air duct 25, for collecting the air which has passed through the endless member and through the bed of material thereon. The air chamber communicates with the chute 7 so that the air passed through the first portion of the endless member adjacent to the entrance end of the cooler, and which is the hottest air, may pass through the chute 7 into the kiln as secondary combustion air. Primary combustion air is drawn from the air chamber by a fan 13, the intake 15 of the fan being connected with the air chamber above a portion of the bed where a substantial portion of the heat has already been withdrawn from the clinker, but where it is still hot. The air drawn in by the fan 13 is therefore not quite as hot as the secondary air which passes directly into the kiln through the chute 7, which is desirable because preignition of the fuel by the primary air must be avoided. The exhaust of the fan 13 is connected with a fuel injection pipe 17 projecting into the discharge end of the kiln. Fuel, such as powdered coal, is delivered into the fuel injection pipe from a bin 14 in the usual manner. The coolest air collecting in the air chamber 40 is discharged through a stack 16 connected with the air chamber above a portion of the bed where most of the heat has been withdrawn from the clinker. In order to avoid mixture of the coolest air with the air passing through the bed below the intake 15 of fan 13, a baffle 45 is placed into the air chamber and a sealing plate 46 which rides on the moving bed of material is hinged to the lower end of the baffle 45. A similar sealing plate 44 which rides on the moving bed of material is hinged to the end wall of the air chamber where the endless member 2 passes out of the air chamber, the plate 44 sealing the gap through which the endless member and the bed of material pass.

It should be understood that it is not intended to limit the invention to the exact details of construction shown and described hereinbefore, for various modifications within the scope of the claims may occur to persons skilled in the art.

It is claimed and desired to secure by Letters Patent:

1. In a system for treating loose material with a fluid, a conveyor arranged to advance said material in the form of a moving bed, means for passing treating fluid through said moving bed, an element arranged at the charge end of said conveyor and adapted to spread the material on said conveyor and to be moved by said bed in response to variations in its thickness, and means responsive to the actuation of said element by said bed, operable to increase the speed of advance of said bed when said element moves in response to an increase in the thickness of said bed, and to decrease the speed of advance of said bed when said element moves in response to a decrease in the thickness of said bed.

2. In a system for treating loose material with a fluid, a conveyor including a conveying element and driving means therefor, arranged to advance the material in the form of a moving bed, means for passing treating fluid through said moving bed, a swingably mounted element above said conveying element at the charge end of said conveyor, adapted to spread the material on said conveyor and operable by said moving bed so as to rise and fall in response to variations in its thickness, and control apparatus for said conveyor driving means, operatively connected with said swingable element and operable to increase the speed of said conveyor driving means in response to a rise of said swingable element and to decrease the speed of said conveyor driving means in response to a fall of said swingable element.

3. In a cooler for cement clinker or the like, a conveyor including an endless conveying element and driving means therefor, arranged to advance the clinker in the form of a moving bed, means for passing cooling air through said endless conveying element and through the bed of clinker thereon, a gate swingably mounted above said conveying element at the charge end of said conveyor and adapted to ride on said moving bed so as to spread the clinker and to rise and fall due to an increase and decrease in the thickness of said bed, and control apparatus for said conveyor driving means, operatively connected with said gate and operable to increase the speed of said conveyor driving means in response to a rise of said gate, and to decrease the speed of said conveyor driving means in response to a fall of said gate.

4. Apparatus for the treatment of cement clinker comprising a clinker cooling chamber, clinker conveying mechanism adapted to advance the clinker in a moving bed through said chamber, a swingable gate at the entrance to the cooling chamber adapted to rest upon said moving bed of clinker to be actuated thereby in response to variation in thickness of the bed, means responsive to the actuation of said gate in response to variations in thickness of the bed traveling thereunder operable to vary the rate of travel of the clinker conveying mechanism in moving the clinker bed.

5. Apparatus for the manufacture and treatment of cement clinker comprising in combination, a clinker cooling chamber, a clinker kiln adapted to deliver clinker into said cooling chamber, conveying mechanism adapted to advance said clinker in a moving bed through the cooling chamber, a gate arranged at the entrance to the cooling chamber resting upon said bed of clinker to level the same, and means coupled with said gate and responsive to actuation thereof in response to variation in thickness of the moving bed of clinker operable to control the movement of the bed of clinker.

6. Apparatus for the manufacture and treatment of cement clinker comprising, in combination, a clinker cooling chamber, a clinker kiln adapted to deliver clinker into said cooling chamber, conveying mechanism adapted to advance said clinker in a moving bed through the cooling chamber, a gate arranged at the entrance to the cooling chamber resting upon said bed of clinker to level the same, and means coupled with said gate and responsive to actuation thereof in response to variation in thickness of the moving bed of clinker operable to speed up the travel of the conveying mechanism as the clinker bed increases in thickness.

7. Apparatus for the manufacture and treatment of cement clinker, comprising a kiln wherein cement clinker is formed, a clinker treatment chamber arranged to receive highly heated cement clinker from said kiln, a conveyor for advancing the clinker received by said treatment chamber, in the form of a moving bed therethrough, means for passing an air draft through said advancing bed of clinker within said treatment chamber, means of communication between said treatment chamber and said kiln through which air passed through said bed of clinker may pass into said kiln, an element at the entrance end of said treatment chamber adapted to spread the clinker on said conveyor and movable by said bed in response to variations in its thickness, and means responsive to the actuation of said movable element by said bed, operable to increase the speed of advance of said bed when said element moves in response to an increase in the thickness of said bed, and to decrease the speed of advance of said bed when said element moves in response to a decrease in the speed of said bed.

RAY C. NEWHOUSE.